US008628699B2

(12) United States Patent
Meyer et al.

(10) Patent No.: US 8,628,699 B2
(45) Date of Patent: Jan. 14, 2014

(54) STABILIZER COMBINATIONS

(75) Inventors: Alexander Meyer, Düsseldorf (DE); Michael Wagner, Moers (DE); Marc Schinner, Ziegenhain (DE)

(73) Assignee: Bayer MaterialScience AG (DE)

( * ) Notice: Subject to any disclaimer, the term of this patent is extended or adjusted under 35 U.S.C. 154(b) by 0 days.

(21) Appl. No.: 13/104,287

(22) Filed: May 10, 2011

(65) Prior Publication Data

US 2011/0272647 A1 Nov. 10, 2011

(30) Foreign Application Priority Data

May 10, 2010 (IT) .............................. RM2010A0226

(51) Int. Cl.
*F21V 9/04* (2006.01)
*F21V 9/06* (2006.01)
*G02B 5/22* (2006.01)
*G02B 5/26* (2006.01)
*C08G 18/77* (2006.01)
*C08K 5/49* (2006.01)

(52) U.S. Cl.
USPC ...... 252/587; 252/400.24; 524/115; 524/121; 524/153; 524/154

(58) Field of Classification Search
USPC ............... 252/587, 400.24; 524/91, 100, 123, 524/130, 147, 208, 287, 315, 318, 323, 115, 524/121, 153, 154; 528/370; 568/716
See application file for complete search history.

(56) References Cited

U.S. PATENT DOCUMENTS

| | | | |
|---|---|---|---|
| 2,991,273 A | 7/1961 | Hechelhammer et al. | |
| 2,999,825 A | 9/1961 | Floyd et al. | |
| 2,999,846 A | 9/1961 | Schnell et al. | |
| 3,028,635 A | 4/1962 | Herubel | |
| 3,148,172 A | 9/1964 | Fox | |
| 3,271,367 A | 9/1966 | Schnell et al. | |
| 4,101,513 A | 7/1978 | Fox et al. | |
| 4,395,463 A | 7/1983 | Kray | |
| 4,707,393 A | 11/1987 | Vetter | |
| 4,982,014 A | 1/1991 | Freitag et al. | |
| 5,041,313 A | 8/1991 | Patel | |
| 5,288,778 A | 2/1994 | Schmitter et al. | |
| 5,391,795 A | 2/1995 | Pickett | |
| 5,627,256 A | 5/1997 | Meier et al. | |
| 5,712,332 A | 1/1998 | Kaieda et al. | |
| 5,821,380 A | 10/1998 | Holderbaum et al. | |
| 5,846,659 A | 12/1998 | Lower et al. | |
| 5,869,185 A | 2/1999 | Bahr et al. | |
| 5,883,165 A | 3/1999 | Krohnke et al. | |
| 6,350,512 B1 | 2/2002 | Hurley et al. | |
| 6,680,350 B1 | 1/2004 | Dobler | |
| 7,442,430 B2 | 10/2008 | Buckel et al. | |
| 2003/0022967 A1 | 1/2003 | Dobler et al. | |
| 2003/0187111 A1 | 10/2003 | Staniek | |
| 2004/0028920 A1 * | 2/2004 | Fujita et al. ................... 428/458 |
| 2004/0131845 A1 | 7/2004 | Fujita | |
| 2004/0228920 A1 | 11/2004 | Boudreau et al. | |
| 2005/0161642 A1 | 7/2005 | Takeda | |
| 2006/0178254 A1 | 8/2006 | Takeda et al. | |
| 2006/0234061 A1 | 10/2006 | Buckel et al. | |
| 2006/0251996 A1 | 11/2006 | Bogerd et al. | |
| 2007/0015081 A1 | 1/2007 | Van den Bogerd et al. | |
| 2008/0026205 A1 | 1/2008 | Sasaki et al. | |
| 2008/0167424 A1 * | 7/2008 | Miyagaki et al. ............. 524/599 |
| 2009/0136730 A1 | 5/2009 | Nakano et al. | |
| 2010/0317776 A1 * | 12/2010 | Wehrmann et al. ............. 524/91 |
| 2011/0144250 A1 * | 6/2011 | Meyer et al. ................... 524/115 |
| 2011/0272646 A1 * | 11/2011 | Meyer ........................... 252/587 |

FOREIGN PATENT DOCUMENTS

| | | |
|---|---|---|
| DE | 1570703 A1 | 2/1970 |
| DE | 2036052 A1 | 1/1972 |
| DE | 2063050 A1 | 7/1972 |
| DE | 2211956 A1 | 10/1973 |
| DE | 2804283 A1 | 8/1978 |
| DE | 3121385 A1 | 8/1982 |
| DE | 3832396 A1 | 2/1990 |
| DE | 10392543 T5 | 4/2005 |
| EP | 0110221 A2 | 6/1984 |
| EP | 0110238 A2 | 6/1984 |
| EP | 0500496 A1 | 8/1992 |
| EP | 0570165 A2 | 11/1993 |
| EP | 0716919 A2 | 6/1996 |
| EP | 0718354 A2 | 6/1996 |
| EP | 0839623 A1 | 5/1998 |
| EP | 1266931 A1 | 12/2002 |
| EP | 1308084 A1 | 5/2003 |
| EP | 1559743 A1 | 8/2005 |
| EP | 1801815 A1 | 6/2007 |
| EP | 1865027 A1 | 12/2007 |
| EP | 2009057 A1 | 12/2008 |
| FR | 1561518 A | 3/1969 |
| GB | 1122003 A | 7/1968 |
| GB | 1229482 A | 4/1971 |
| GB | 1341318 A | 12/1973 |
| GB | 1367790 A | 9/1974 |
| GB | 1467901 A | 3/1977 |
| JP | 06240146 A | 8/1994 |
| JP | 2003-277045 A | 10/2003 |
| JP | 2006-219662 A | 8/2006 |
| JP | 2008-024902 A | 2/2008 |
| JP | 2008-150548 A | 7/2008 |
| JP | 2008-214596 A | 9/2008 |
| JP | 2009258581-1 | 11/2009 |
| WO | WO-9615102 A2 | 5/1996 |
| WO | WO-01/18101 A1 | 3/2001 |
| WO | WO-2005037932 A1 | 4/2005 |
| WO | WO-2006/108520 A1 | 10/2006 |
| WO | WO-2007008476 A2 | 1/2007 |
| WO | WO-2008071363 A2 | 6/2008 |
| WO | WO-2008/109072 A1 | 9/2008 |
| WO | WO-2009059901 A2 | 5/2009 |

\* cited by examiner

*Primary Examiner* — Bijan Ahvazi
(74) *Attorney, Agent, or Firm* — Novak Druce Connolly Bove + Quigg LLP

(57) ABSTRACT

The present invention relates to a stabilizer combination for stabilizing IR absorbers, comprising a) at least one stabilizer based on phosphine, b) at least one stabilizer based on phosphite, and c) at least one phenolic antioxidant stabilizer.

14 Claims, No Drawings

STABILIZER COMBINATIONS

CROSS REFERENCE TO RELATED APPLICATIONS

This application claims benefit to Italian Patent Application No. RM 2010A000226, filed May 10, 2010, which is incorporated herein by reference in its entirety for all useful purposes.

BACKGROUND

Glazing produced from compositions comprising transparent thermoplastic polymers, such as e.g. polycarbonate, offers many advantages over conventional glazing of glass for the vehicle sector and for buildings. These include e.g. increased fracture-proof properties or saving in weight, which in the case of automobile glazing makes possible a higher safety of passengers in the event of traffic accidents and a lower fuel consumption. Finally, transparent materials which contain transparent thermoplastic polymers allow a considerably greater freedom of design due to the simpler formability.

A disadvantage is, however, that the high transparency to heat (i.e. transparency to IR radiation) of transparent thermoplastic polymers in sunlight leads to an undesirable heating inside vehicles and buildings. The increased temperatures in the inside reduce the comfort for the passengers or occupants and can result in increased demands on the air-conditioning, which in turn increase energy consumption and in this way cancel out the positive effects again. In order nevertheless to take into account the requirement of a low energy consumption combined with a high passenger comfort, panes which are equipped with appropriate heat protection, which is ensured over a long period of use, are necessary. This applies in particular to the automobile sector.

As has been known for a long time, the majority of solar energy falls to the range of the near infra-red (NIR) between 750 nm and 2500 nm, in addition to the visible range of light between 400 nm and 750 nm. Penetrating solar radiation e.g. is absorbed inside an automobile and emitted as long wavelength thermal radiation with a wavelength of from 5 µm to 15 µm. Since in this range conventional glazing materials—in particular thermoplastic polymers which are transparent in the visible range—are not transparent, the thermal radiation cannot radiate outwards. A greenhouse effect is obtained and the interior heats up. In order to keep this effect as low as possible, the transmission of the glazing in the NIR should therefore be minimized as far as possible. Conventional transparent thermoplastic polymers, such as e.g. polycarbonate, however, are transparent both in the visible range and in the NIR.

Additives e.g. which have the lowest possible transparency in the NIR without adversely influencing the transparency in the visible range of the spectrum are therefore required.

Among the transparent thermoplastics, polymers based on polymethyl methacrylate (PMMA) and polycarbonate are particularly suitable for use as glazing material. Due to the high toughness, polycarbonate in particular has a very good profile of properties for such intended uses.

In order to impart to these plastics heat-absorbing properties, corresponding infra-red absorbers are therefore employed as additives. In particular, IR absorber systems which have a broad absorption spectrum in the NIR range (near infra-red, 750 nm-2500 nm) with a simultaneously low absorption in the visible range (low inherent colour) are of interest for this. The corresponding polymer compositions should moreover have a high heat stability and an excellent light stability.

A large number of IR absorbers based on organic or inorganic materials which can be employed in transparent thermoplastics are known. A selection of such materials is described e.g. in J. Fabian, H. Nakazumi, H. Matsuoka, Chem. Rev. 92, 1197 (1992), in U.S. Pat. No. 5,712,332 or JP-A 06240146.

Nevertheless, IR-absorbing additives, in particular those based on organic materials, often have the disadvantage that they have a low stability towards exposure to heat or irradiation. Thus, many of these additives are not sufficiently stable to heat to be able to be incorporated into transparent thermoplastics, since temperatures up to 350° C. are required during their processing.

Furthermore, the glazing is often exposed to temperatures of more than 50° C. over relatively long periods of time during use, due to the solar irradiation, which can lead to decomposition or to degradation of the IR-absorbing additives (IR absorbers).

Although IR-absorbing additives based on inorganic materials are often significantly more stable compared with organic additives, these also show a significant degradation in the absorber performance over time, in particular under high exposure to heat, i.e. at temperatures >50° C. for a relatively long period of time. In the case of buildings and automobile glazing, total exposure times of days, weeks or even years are to be taken into account here. The fact that IR absorbers based on inorganic materials show unstable properties under exposure to heat was surprising, since the person skilled in the art in principle assumes that inorganic systems based on metal oxide or boride have a high heat stability.

Materials based on finely divided borides, such as e.g. lanthanum hexaboride, have become established as inorganic IR absorbers, since they have a broad absorption band. Such borides based on La, Ce, Pr, Nd, Tb, Dy, Ho, Y, Sm, Eu, Er, Tm, Yb, Lu, Sr, Ti, Zr, Hf, V, Ta, Cr, Mo, W and Ca are described e.g. in DE 10392543 or EP 1 559 743.

IR absorbing additives from the group of tungsten compounds which have a lower inherent absorption in the visible spectral range compared with the inorganic boride-based IR absorbers known from the prior art are furthermore known, in particular zinc-doped tungsten compounds with an increased long-term stability preferably being used.

In the context of the invention, inorganic IR absorbers in particular are stabilized by the present stabilizer combination. Among the inorganic IR absorbers, in particular borides, here especially lanthanum hexaboride, tungstates, in this case in particular caesium tungstates and zinc-doped caesium tungstates, tin oxides, in particular indium tin oxide (ITO), and tin-doped antimony oxide (ATO) are preferred.

The preparation and the use of these absorbers in thermoplastic materials are described, for example, in H. Takeda, K. Adachi, J. Am. Ceram. Soc. 90, 4059-4061, (2007), WO 2005037932, JP 2006219662, JP 2008024902, JP 2008150548, WO 2009/059901 and JP 2008214596.

It was moreover known to use heat stabilizers, such as, for example, phosphites, hindered phenols, aromatic, aliphatic or aliphatic-aromatic phosphines, lactones, thioethers and hindered amines (HALS, hindered amine light stabilizers) in thermoplastic materials to improve the processing properties.

WO-A 01/18101 discloses moulding compositions comprising a thermoplastic and a phthalo- or naphthalocyanine dyestuff which can contain antioxidants, such as phosphites, hindered phenols, aromatic, aliphatic or mixed phosphines, lactones, thioethers and hindered amines to improve the processing stability.

In all the thermoplastic compositions with IR absorbers published to date, the heat stabilizer serves exclusively, however, to stabilize the particular polymer matrix—in particular during processing. By using these systems, the yellow coloration of the polycarbonate after exposure to light, as described in EP 1266931, can thus be limited.

In the case of all the abovementioned IR absorbers, also in combination with in each case conventional stabilizers, it has been found, however, that the long-term stability under exposure to heat such as occurs in the life cycle of the materials is inadequate.

This applies not only to the organic but also to the inorganic IR absorbers in a transparent thermoplastic polymer matrix, so that after storage of the corresponding polymer compositions, such as e.g. a polycarbonate composition, in heat at elevated temperature the absorption in the IR range decreases significantly.

For use of the compositions in the glazing sector, in particular for automobile glazing, however, it is absolutely essential that the corresponding IR-absorbing polymer compositions have a long-term stability to higher temperatures. Higher temperatures mean e.g. temperatures which an article of polycarbonate can assume under intensive solar irradiation (e.g. 50° C.-110° C.). It must furthermore be ensured that the composition can be processed under conventional process conditions, without the IR-absorbing properties already being reduced as a result.

It was known from DE 10 2009 058200 that IR absorbers based on caesium tungstate can be stabilized in the thermoplastic matrix by addition of triphenylphosphine. Nevertheless, a marked degradation of the stabilizer performance in a long-term experiment at a temperature of 120° C. is also found with this stabilizer.

DESCRIPTION OF PREFERRED EMBODIMENTS

The invention relates to stabilizer combinations for stabilizing infra-red absorbers (IR absorbers) in heat-absorbing polymer compositions based on transparent thermoplastics, and to the use of the stabilizer combinations according to the invention for the preparation of heat-absorbing polymer compositions and the products produced therefrom. In particular the present invention relates to stabilizer combinations for stabilizing inorganic IR absorbers.

The object of the present invention was to provide stabilizers which significantly improve the long-term stability of known IR absorbers, in particular inorganic IR absorbers, and to provide compositions with IR absorbers stabilized in the long term.

It has been found, surprisingly, that IR absorbers, preferably inorganic IR absorbers, further preferably inorganic IR absorbers based on tungstate or boride, e.g. are stabilized particularly well in thermoplastic compositions by a stabilizer combination comprising at least one stabilizer based on phosphine, at least one stabilizer based on phosphite and at least one stabilizer from the group of phenolic antioxidants.

One embodiment of the present invention is a stabilizer combination for stabilizing IR absorbers, comprising a) at least one stabilizer based on phosphine, b) at least one stabilizer based on phosphite, and c) at least one phenolic antioxidant stabilizer.

Another embodiment of the present invention is a composition comprising a) at least one IR absorber; b) the above stabilizer combination, and c) optionally at least one transparent thermoplastic.

Yet another embodiment of the present invention is a masterbatch comprising
C.1: 85 wt. % to 98.895 wt. % of a transparent thermoplastic;
C.2: 0.1 wt. %-2 wt. % of an IR absorber,
C.3: 1 wt. %-4.8 wt. % of dispersing agent
C.4: 0.005 wt. %-1 wt. % of the stabilizer combination according to claim 1, and
C.5: optionally 0-8 wt. % of at least one further auxiliary substance and/or additive.

Yet another embodiment of the present invention is a method for stabilizing IR absorbers comprising adding the above stabilizer combination to a composition which comprises at least IR absorber and a thermoplastic material.

Yet another embodiment of the present invention is an automobile, railway vehicle, aircraft or architectural glazing comprising the composition according to claim 1.

Phosphines in the context of the present invention are derived from compounds of the general type $P_nH_{n+2}$, in particular from $PH_3$, wherein preferably all the hydrogen atoms are replaced by aliphatic and/or aromatic hydrocarbon radicals, wherein the aromatic hydrocarbon radicals can contain further substituents, such as, for example, alkyl groups. The phosphines here can contain one phosphorus atom, or several phosphorus atoms bridged via corresponding aliphatic and/or aromatic hydrocarbons.

Phosphites in the context of the present invention are to be understood as meaning esters of phosphonic acid (often also called phosphorous acid esters) with the general structure $P(OR)_3$, wherein R represents aliphatic and/or aromatic hydrocarbon radicals, wherein the aromatic hydrocarbon radicals can contain further substituents, such as, for example, alkyl groups.

Phosphonates are to be understood as meaning compounds derived from the base structure $R—PO(OH)_2$, wherein R represents aliphatic and/or aromatic hydrocarbon radicals, wherein the aromatic hydrocarbon radicals can contain further substituents, such as, for example, alkyl groups. The OH groups of the base structure can be partly or completely esterified to OR functionalities, wherein R in turn represents aliphatic and/or aromatic hydrocarbon radicals, wherein the aromatic hydrocarbon radicals can contain further substituents, such as, for example, alkyl groups, or partly or completely deprotonated, the negative overall charge being compensated by a corresponding counter-ion.

Phosphonites in the context of the present invention are to be understood as meaning esters, in particular diesters, of phosphonous acid of the type $R—P(OR)_2$, wherein R represents aliphatic and/or aromatic hydrocarbon radicals, wherein the aromatic hydrocarbon radicals can contain further substituents, such as, for example, alkyl groups. The phosphonites here can contain one phosphorus atom, or several phosphorus atoms bridged via corresponding aliphatic and/or aromatic hydrocarbons.

In the context of the present inventions, phosphates are to be understood as meaning salts, partial or complete esters and condensates of phosphoric acid ($H_3PO_4$).

There are no limitations with respect to the choice of the phosphines, the phosphine compounds preferably being chosen from the group which includes aliphatic phosphines, aromatic phosphines and aliphatic-aromatic phosphines.

The phosphine compounds can be primary, secondary and tertiary phosphines. Preferably, tertiary phosphines are employed, aromatic phosphines being particularly preferred and tertiary aromatic phosphines being very particularly preferred.

In a preferred embodiment of the present invention, triphenylphosphine (TPP), trialkylphenylphosphine, bisdiphenylphosphino-ethane or a trinaphthylphosphine, of which triphenylphosphine (TPP) is very particularly preferred, or mixtures of these phosphines are employed.

In principle, mixtures of various phosphines can be employed.

In one embodiment, the IR absorber according to the invention is mixed with the stabilizer combination according to the invention before incorporation into the thermoplastic polymer matrix.

The preparation and properties of phosphine compounds are known to the person skilled in the art and are described, for example, in EP-A 0 718 354 and "Ullmanns Enzyklopädie der Technischen Chemie", 4th ed., vol. 18, p. 378-398 and Kirk-Othmer, 3rd ed., vol. 17, p. 527-534.

In the case of the amount of the phosphine compound employed in the stabilizer mixture, it is to be taken into account that under certain processing conditions the substance is oxidized, depending on the temperature and dwell time. The oxidized content is no longer available for stabilizing the IR absorber employed. The number of processing steps and the particular process conditions are therefore to be taken into account. After processing by means of heat, the composition thus also still contains certain amounts of oxidized phosphine, particularly preferably triphenylphosphine oxide.

Commercially obtainable suitable phosphite stabilizers in the context of the present invention are, for example, Irgafos® 168 (tris(2,4-di-tert-butyl-phenyl) phosphite/CAS no. 31570-04-4), Irgafos® TPP (CAS no. 101-02-0) and Irgafos® TNPP (CAS no. 26523-78-4), Irgafos® 168 being particularly preferred.

Commercially obtainable suitable phenolic antioxidants are, for example, Irganox® 1076 (CAS no. 2082-79-3/2,6-di-tert-butyl-4-(octadecanoxycarbonylethyl)phenol) and Irganox® 1010 (CAS no. 6683-19-8).

In a preferred embodiment, the stabilizer combination comprises triphenylphosphine and Irgafos 168® and Irganox 1076®.

Alternatively to Irganox 1076®, Irganox® 1010 (pentaerythritol 3-(4-hydroxy-3,5-di-tert-butylphenyl)propionate; CAS no.: 6683-19-8) can be used.

The content of stabilizer combination in the total composition is 0.001 wt. %-0.500 wt. %, preferably 0.005 wt. %-0.250 wt. %, further preferably 0.010 wt. %-0.150 wt. % and particularly preferably 0.015 wt. %-0.125 wt. %, based on the total weight of the composition.

The stabilizer combination preferably comprises
   a) 10 wt. %-89 wt. %, further preferably 20 wt. %-78 wt. % and particularly preferably 30 wt. %-67 wt. % of at least one phosphine stabilizer,
   b) 10 wt. %-89 wt. %, further preferably 20 wt. %-78 wt. % and particularly preferably 30 wt. %-67 wt. % of at least one phosphite stabilizer, and
   c) 1 wt. %-50 wt. %, further preferably 2 wt. %-40 wt. % and particularly preferably 3 wt. %-20 wt. % of at least one phenolic antioxidant,
   the sum of components a)-c) adding up to 100.

Preferably, the amount of non-oxidized phosphine stabilizer in the end product is >0.01 wt. %, further preferably >0.02 wt. %.

In a preferred embodiment, the ratio of phosphite stabilizer to phenolic antioxidant is from 1:5 to 10:1, further preferably from 1:5 to 5:1 and particularly preferably 4:1.

In a further preferred embodiment, the ratio of phosphine (a) to the mixture of phosphite and phenolic antioxidant (b+c) is preferably 8:1 to 1:9, further preferably 1:5 to 5:1, the ratio of phosphite stabilizer (b) to phenolic antioxidant (c) being from 1:5 to 10:1, further preferably from 1:5 to 5:1 and particularly preferably 4:1.

In order to stabilize the thermoplastic matrix, in addition to the combination according to the invention employed for stabilizing the IR absorber, further phosphorus-based stabilizers can be employed, as long as these do not adversely influence the effect of the stabilizing described above.

In a particular embodiment, the composition also contains, in addition to the phosphines, phosphites and phenolic antioxidants mentioned, lactone-based free radical scavengers, such as HP136 (CAS: 181314-48-7)

While the abovementioned stabilizers evidently have a stabilizing effect on IR absorbers, preferably inorganic IR absorbers, it has been found, surprisingly, that phosphates, phosphoric acid, phosphoric acid derivatives or corresponding stabilizers which contain or can form these compounds lead to a faster damage to the IR absorbers according to the invention and therefore to a decrease in the IR absorption.

Where inorganic IR absorbers based on tungstate are used as the IR absorber, this is preferably an inorganic IR absorber from the group of tungsten compounds of the type
   b1) $W_yO_z$ (W=tungsten, O=oxygen; z/y=2.20-2.99) and/or
   b2) $M_xW_yO_z$ (M=H, He, alkali metal, alkaline earth metal, metal from the group of rare earths, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi; x/y=0.001-1.000; z/y=2.2-3.0), the elements H, Cs, Rb, K, Tl, In, Ba, Li, Ca, Sr, Fe and Sn being preferred as M, of these Cs being very particularly preferred. $Ba_{0.33}WO_3$, $Tl_{0.33}WO_3$, $K_{0.33}WO_3$, $Rb_{0.33}WO_3$, $Cs_{0.33}WO_3$, $Na_{0.33}WO_3$, $Na_{0.75}WO_3$, and mixtures thereof are particularly preferred. In a particular embodiment of the present invention, the sole use of $Cs_{0.33}WO_3$ as the inorganic IR absorber is very particularly preferred. Cs/W ratios of 0.20 and 0.25 are likewise preferred, the abovementioned tungsten compounds of type b1) and b) being called tungstates in the following.

The IR-absorbing inorganic tungstate is preferably dispersed in an organic matrix. Preferably, the tungstates are employed in an amount of 0.0075 wt. %-0.0750 wt. %, preferably 0.0100 wt. %-0.0500 wt. % and particularly preferably 0.0125 wt. %-0.0375 wt. %, calculated as the solids content of tungstate in the total polymer composition. In this connection, solids content of tungstate means the tungstate as the pure substance and not a suspension or other formulation containing the pure substance.

In a particular embodiment of the present invention, it has been found, completely surprisingly, that there is a particularly pronounced synergistic effect in particular between zinc-doped caesium tungstate and the combination of phosphine, phosphite and phenolic antioxidant with respect to the long-term stability of the tungstate at elevated temperature (120° C.). This was completely surprising and was not to be expected.

These specific doped tungstates are substances of the type $Zn_wM_xW_yO_z$ (M=at least one element chosen from the group consisting of H, He, alkali metal, alkaline earth metal, metal from the group of the rare earths, Mg, Zr, Cr, Mn, Fe, Ru, Co, Rh, Ir, Ni, Pd, Pt, Cu, Ag, Au, Cd, Al, Ga, In, Tl, Si, Ge, Sn, Pb, Sb, B, F, P, S, Se, Br, Te, Ti, Nb, V, Mo, Ta, Re, Be, Hf, Os, Bi; x/y=0.001-1.000; z/y=2.2-3.0; w=0.001-0.015), wherein the elements H, Cs, Rb, K, Tl, In, Ba, Li, Ca, Sr, Fe and Sn are preferred as M, of these Cs being very particularly preferred. Zinc-doped $Ba_{0.33}WO_3$, $Tl_{0.33}WO_3$, $K_{0.33}WO_3$, $Rb_{0.33}WO_3$, $Cs_{0.33}WO_3$, $Na_{0.33}WO_3$, $Na_{0.75}WO_3$, and mixtures thereof are furthermore particularly preferred.

In a particular embodiment of the present invention, the sole use of Zn, $Cs_{0.33}WO_3$ (where w=0.001-0.015) as the inorganic IR absorber is very particularly preferred. Compounds with Cs/W ratios of from 0.20 to 0.25 are likewise known.

Where IR absorbers based on boride are employed, nanoscale inorganic IR absorber particles based on boride are preferred, preferably a metal boride, the metal being chosen from the group of the following elements La, Ce, Pr, Nd, Tb, Dy, Ho, Y, Sm, Eu, Er, Tm, Yb, Lu, Sr, Ti, Zr, Hf, V, Ta, Cr, Mo, W and Ca, The form of the hexaboride is particularly preferred. Lanthanum hexaboride ($LaB_6$), praseodymium boride ($PrB_6$), neodymium boride ($NdB_6$), cerium boride ($CeB_6$), terbium boride ($TbB_6$), dysprosium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calcium boride ($CaB_6$), titanium boride ($TiB_2$), zirconium boride ($ZrB_2$), hafnium boride ($HfB_2$), vanadium boride ($VB_2$), tantalum boride ($TaB_2$), chromium boride (CrB and $CrB_2$), molybdenum boride ($MoB_2$, $Mo_2B_5$ and MoB), tungsten boride ($W_2B_5$), or combinations of these borides are particularly preferred. Borides based on lanthanum hexaboride ($LaB_6$) or mixtures containing lanthanum hexaboride are very particularly preferred.

In this context, it has furthermore been found, surprisingly, that only certain groups of stabilizers are synergistically active, whereas other stabilizers of similar structure either have no effect or are even harmful and even accelerate further the decrease in the IR absorption. In the context of the present invention, it has thus been found that phosphorus-based stabilizers in the form of their phosphines in combination with other stabilizers prove to be positive and stabilize the IR absorbers, whereas the sole use of phosphorus-containing stabilizers of the type of phosphites, phosphonates or phosphorites proves to be scarcely effective to ineffective, When phosphates, phosphoric acid, phosphoric acid derivatives or corresponding stabilizers which contain or can form these compounds are used, faster damage to the IR absorbers even occurs. These compounds derived from phosphates, phosphoric acid and phosphoric acid derivatives can also adversely influence the stability of the IR absorbers in combination with the IR absorbers according to the invention.

In particular, it has been found that the combination of zinc-doped tungstates with triphenylphosphine, phosphite and phenolic antioxidant leads to particularly advantageous properties.

The object of the present invention is thus achieved by a composition comprising at least one IR absorber, preferably an inorganic IR absorber, further preferably from the group which includes borides, here very particularly preferably lanthanum hexaboride, tungstates, in particular caesium tungstates and zinc-doped caesium tungstates, further preferably $Zn_wCs_{0.33}WO_3$ (w=0.001-0.015), tin oxides, in particular indium tin oxide (ITO) and tin-doped antimony oxide (ATO).

a stabilizer combination comprising at least one phosphine compound, a phosphite compound and a phenolic antioxidant, where the phosphine is preferably triphenylphosphine (TPP), trialkylphenylphosphine, trinaphthylphosphine or bisdiphenylphosphinoethane, triphenylphosphine (TPP) being particularly preferred, the phosphite is preferably Irgafos® 168 (tris(2,4-di-tert-butyl-phenyl) phosphite/CAS no. 31570-04-4), Irgafos® TPP (CAS no. 101-02-0) or Irgafos® TNPP (CAS no. 26523-78-4), Irgafos® 168 being particularly preferred, and the phenolic antioxidant is preferably Irganox® 1076 (2,6-di-tert-butyl-4-(octadecanoxycarbonylethyl)phenol) or Irganox® 1010 (CAS no. 6683-19-8), and optionally a transparent thermoplastic, preferably polycarbonate, copolycarbonate, polystyrene, styrene copolymer, aromatic polyester, such as polyethylene terephthalate (PET), PET-cyclohexanedimethanol copolymer (PETG), polyethylene naphthalate (PEN), polybutylene terephthalate (PBT), cyclic polyolefin, poly- or copolymethyl methacrylates, such as polymethyl methacrylate, further preferably polycarbonate, copolycarbonate, aromatic polyester or polymethyl methacrylate, or mixtures of the components mentioned, and particularly preferably polycarbonate and copolycarbonate.

In a preferred embodiment, where a zinc-doped tungstate is employed the ratio of zinc oxide to $Cs_{0.33}WO_3$ in component A) is 22.6 to 76.4 wt. %.

If component C is present, the content of stabilizer combination in the total composition is preferably 0.001 wt. %-0.500 wt. %, further preferably 0.005 wt. %-0.250 wt. %, still further preferably 0.01 wt. %-0.15 wt. % and particularly preferably 0.015 wt. %-0.125 wt. %, based on the total weight of the composition.

The invention furthermore provides a process for the preparation of the compositions according to the invention and the use thereof and polymer compositions prepared therefrom and products produced therefrom.

The particle diameter of inorganic IR absorbers is preferably less than 200 nm, further preferably less than 100 nm and more preferably less than 50 nm, the particle diameter in each case preferably being greater than 5 nm, further preferably greater than 10 nm. In a particularly preferred embodiment, the average particle diameter is between 15 nm to 25 nm. The particles are transparent in the visible range of the spectrum, transparent meaning that the absorption of these IR absorbers in the visible range of light is low compared with the absorption in the IR range and the IR absorber leads to no significantly increased clouding or significant reduction in transmission (in the visible range of light) of the composition or the particular end product.

If tungstates are to be employed, these have an amorphous, a cubic, tetragonal or hexagonal tungsten bronze structure. The preparation of doped tungstates is described in WO2005037932.

For the preparation of such materials e.g. tungsten trioxide, tungsten dioxide, a hydrate of a tungsten oxide, tungsten hexachloride, ammonium tungstate or tungstic acid and a zinc salt, preferably zinc oxide, and at least one further salt containing the element M, such as e.g. caesium carbonate, are mixed in certain stoichiometric ratios, so that the molar ratios of the individual components are represented by the formula $Zn_wM_yWO_3$ (w=0.001-0.015). This mixture is then treated at temperatures of between 100° C. and 850° C. in a reducing atmosphere, e.g. an argon-hydrogen atmosphere, and finally the powder obtained is heat-treated at temperatures of between 550° C. and 1,200° C. under an inert gas atmosphere.

Inorganic IR absorbers based on boride are likewise used in the form of finely divided particles. The preparation can be carried out e.g. from oxides of the rare earths, such as e.g. $X_2O_3$ (where X e.g. =La, Ce, Pr, Nd, Gd) and e.g. boron carbides ($B_4C$) by mixing these compounds and subjecting the mixture to heat treatment in vacuo at high temperatures, such as e.g. 1,500° C., for some hours, such as e.g. 3 hours.

The boride is obtained in the form of a powder. There is no limitation at all with respect to the shape of the finely divided particles—and the particles can thus have a spherical, platelet-like, irregular or needle-like shape. The absorption capacity for IR radiation is greater the more crystalline the boride particles. However, particles with a low crystallinity (e.g. characterized by a broad diffraction peak in the x-ray diffraction experiment) have an adequate IR absorption property in the context of the invention. Nevertheless, this is only the case if the particles have a bond inside between the metal used and boron. The colour of the particles in the powder can be e.g. greyish-black, brownish-black, greenish-black or the like.

The surface of the particles can be treated. Thus, the surface can be treated with a silane or provided with a titanium-based, zirconium-based layer or similar layers. The resistance to moisture can be increased by this treatment. This type of coating increases the long-term stability with respect to the IR absorption and is described e.g. in US20050161642.

In addition to the particles based on boride, further particles based on $SiO_2$, $TiO_2$, $ZrO_2$, $Al_2O_3$ or MgO can be—but are not necessarily—present. These particles are preferably present in a size of less than 200 nm.

In the present invention, the finely divided IR absorber particles are introduced into the polymer matrix in the form of a dispersion. This dispersion prevents the reagglomeration and facilitates the incorporation into a thermoplastic matrix, such as e.g. polycarbonate. Polymer-like dispersing agents are preferably employed. Suitable polymer-based dispersing agents are, above all, dispersing agents which have a high light transmission, such as e.g. polyacrylates, polyurethanes, polyethers, polyesters or polyurethanes, and polymers derived therefrom. Polyacrylates, polyethers and polyester-based polymers are preferred as dispersing agents. Dispersing agents of high heat stability are preferably employed.

For the preparation of the inorganic IR absorber nanoparticles according to the invention, the IR absorber can be mixed with the dispersing agents described below and further organic solvents, such as e.g. toluene, benzene or similar aromatic hydrocarbons, and the mixture can be ground in suitable mills, such as e.g. ball mills, with the addition of zirconium oxide (e.g. with a diameter of 0.3 mm), in order to establish the desired particle size distribution. The nanoparticles are obtained in the form of a dispersion. After the grinding, further dispersing agents can optionally be added. The solvent is removed at elevated temperatures under reduced pressure.

The size of the particles can be determined with the aid of transmission electron spectroscopy (TEM). Such measurements on IR absorber nanoparticles are described e.g. in Adachi et al., J. Am. Ceram. Soc. 2008, 91, 2897-2902.

For use in transparent thermoplastics, the particles obtained in this way are dispersed in an organic matrix, e.g. in an acrylate, and optionally ground as described above in a mill using suitable auxiliary substances, such as e.g. zirconium dioxide, and optionally using organic solvents, such as, for example, toluene, benzene or similar hydrocarbons.

Suitable polymer-based dispersing agents are, above all, dispersing agents which have a high light transmission, such as e.g. polyacrylates, polyurethanes, polyethers, polyesters or polyester-urethanes, and polymers derived therefrom.

Preferred dispersing agents are polyacrylates, polyethers and polyester-based polymers, polyacrylates, such as e.g. polymethyl methacrylate or polymethyl acrylate (together called polymethyl (meth)acrylate) and polyester being particularly preferred as dispersing agents of high heat stability. Mixtures of these polymers or also copolymers based on acrylate can also be employed. Such dispersing auxiliaries and methods for the preparation of tungstate dispersions are described e.g. in JP 2008214596 and in Adachi et al, J. Am. Ceram. Soc. 2007, 90 4059-4061.

Dispersing agents which are suitable for the present invention are commercially obtainable. Dispersing agents based on polyacrylate are suitable in particular. Such suitable dispersing agents are obtainable e.g. under the trade names EFKA®, e.g. EFKA® 4500 and EFKA® 4530 from Ciba Specialty Chemicals. Polyester-containing dispersing agents are likewise suitable. They are obtainable, for example, under the trade names Solspelse®, e.g. Solsperse® 22000, 24000SC, 26000, 27000, from Avecia. Polyether-containing dispersing agents are furthermore known e.g. under the trade names Disparlon® DA234 and DA325 from Kusumoto Chemicals. Polyurethane-based systems are also suitable. Polyurethane-based systems are obtainable under the trade name EFKA® 4046, EFKA® 4047 from Ciba Specialty Chemicals. Texaphor® P60 and P63 are corresponding trade names from Cognis.

The amount of IR absorber in the dispersing agent is 0.2 wt. % to 80.0 wt. %, preferably 1.0 wt. %-40.0 wt. %, further preferably 5 wt. %-35 wt. % and most preferably 10 wt. %-30 wt. %, based on the inorganic IR absorber dispersion employed according to the invention. The total composition of the ready-to-use IR absorber formulation can also contain, in addition to the IR absorber pure substance and the dispersing agent, further auxiliary substances, such as, for example, zirconium dioxide, and residual solvent, such as, for example, toluene, benzene or similar aromatic hydrocarbons.

In the case of tungstates, there is no limitation at all with respect to the tungstate content in the polymer compositions according to the invention. However, the tungstates are conventionally employed in an amount of 0.0001 wt. %-10.0000 wt. %, preferably 0.0010 wt. %-1.0000 wt. % and particularly preferably 0.0020 wt. %-0.1000 wt. %, calculated as the solids content of tungstate or of zinc-doped tungstate in the total polymer composition.

In a particular embodiment of the invention, the amount of tungstates according to the invention employed is 0.0090 wt. %-0.0200 wt. %, preferably 0.0120 wt. % to 0.0180 wt. %, in turn stated as the solids content of tungstate in the total polymer composition. Solids content of tungstate in this connection means, unless explicitly stated otherwise, the tungstate as the pure substance and not a dispersion, suspension or other formulation containing the pure substance, the following data for the tungstate content also always relating to this solids content.

In the case of borides, the borides are employed in an amount of 0.0015 wt. %-0.0150 wt. %, preferably 0.0020 wt. %-0.0110 wt. % and particularly preferably 0.0027 wt. %-0.0080 wt. %, calculated as the solids content of boride in the total polymer composition. In a particular embodiment which can contain further colouring agents, the borides are employed in an amount of preferably 0.0035 wt. % to 0.0085 wt. % and particularly preferably 0.004 to 0.008 wt. %, calculated as the solids content of boride in the total polymer composition. In this connection, solids content of boride means the boride as the pure substance and not a suspension or other formulation containing the pure substance.

These concentrations are preferably used for finished parts with thicknesses of 2 mm-8 mm, preferably 3.5 mm-7.0 mm and particularly preferably 4 mm-6 mm.

In further particular embodiments, in particular for uses in track vehicles and aircraft, the thickness of the glazing can also be more than 8 mm, preferably 9 mm-15 mm, the concentration of the corresponding IR absorbers and stabilizers being adapted here accordingly.

The IR absorbers, particularly preferably inorganic IR absorbers, can also be used in the form of mixtures with one another. Thus, in the case of mixtures, compositions which contain two up to and including five and particularly preferably two or three different IR absorbers are preferred.

In the mixtures, the IR absorbers are preferably chosen from the group of tungstates, borides and tin oxides, particularly preferably caesium tungstate, zinc-doped caesium tungstate $LaB_6$ or antimony-doped tin oxide or indium tin oxide.

The IR absorbers can be combined such that a maximum absorption range is covered by the maxima of the individual IR absorbers.

Suitable additional organic infra-red absorbers are described according to substance classes e.g. in M. Matsuoka, Infrared Absorbing Dyes, Plenum Press, New York, 1990. Infra-red absorbers from the classes of phthalocyanines, naphthalocyanines, metal complexes, azo dyestuffs, anthraquinones, quadratic acid derivatives, immonium dyestuffs, perylenes, quateiylenes and polymethines are particularly suitable. Of these, phthalocyanines and naphthalocyanines are very particularly suitable.

Due to the improved solubility in thermoplastics, phthalocyanines and naphthalocyanines with sterically bulky side groups are to be preferred, such as, for example, phenyl, phenoxy, alkylphenyl, alkylphenoxy, test-butyl, (—S-phenyl), —NH-aryl, —NH-alkyl and similar groups.

Compounds such as indium oxide which is doped with 2 to 30 atom %, preferably with 4 to 12 atom % of tin (ITO) or with 10 to 70 atom % of fluorine can furthermore be added.

The combination with tin oxide as a further IR absorber which is doped with 2 to 60 atom % of antimony (ATO) or with 10 to 70 atom % of fluorine is particularly preferred.

Zinc oxide which is doped with 1 to 30 atom %, preferably with 2 to 10 atom % of aluminium or with 2 to 30 atom % of indium or with 2 to 30 atom % of gallium is furthermore particularly suitable.

Mixtures of the abovementioned infra-red absorbers are particularly suitable, since by a targeted choice the person skilled in the art can achieve an optimization of the absorption in the near infra-red range.

In a further specific embodiment of the present invention, the phosphine compounds according to the invention are employed together with a phosphite or a phenolic antioxidant or a mixture of the two latter compounds.

In a further embodiment, the IR absorber is mixed with the stabilizer combination according to the invention or a mixture containing the stabilizer combination according to the invention before incorporation into the thermoplastic polymer matrix.

The preparation and properties of phosphine compounds are known to the person skilled in the art and are described, for example, in EP-A 0 718 354 and "Ullmanns Enzyklopädie der Technischen Chemie", 4th ed., vol. 18, p. 378-398 and Kirk-Othmer, 3rd ed., vol. 17, p. 527-534.

In a preferred embodiment, the polymer composition according to the invention furthermore contains an ultraviolet absorber. Ultraviolet absorbers which are suitable for use in the polymer composition according to the invention are compounds which have the lowest possible transmission below 400 nm and the highest possible transmission above 400 nm. Such compounds and their preparation are known from the literature and are described, for example, in EP-A 0 839 623, WO-A 96/15102 and EP-A 0 500 496. Ultraviolet absorbers which are particularly suitable for use in the composition according to the invention are benzotriazoles, triazines, benzophenones and/or arylated cyanoacrylates.

Particularly suitable ultraviolet absorbers are hydroxybenzotriazoles, such as 2-(3',5'-bis-(1,1-dimethylbenzyl)-2'-hydroxy-phenyl)-benzotriazole (Tinuvin® 234, Ciba Spezialitätenchemie, Basel), 2-(2'-hydroxy-5'-(tert-octyl)-phenyl)-benzotriazole (Tinuvin® 329, Ciba Spezialitätenchemie, Basel), 2-(2'-hydroxy-3'-(2-butyl)-5'-(tert-butyl)-phenyl)-benzotriazole (Tinuvin® 350, Ciba Spezialitätenchemie, Basel), bis-(3-(2H-benzotriazolyl)-2-hydroxy-5-tert-octyl)methane, (Tinuvin® 360, Ciba Spezialitätenchemie, Basel), (2-(4,6-diphenyl-1,3,5-triazin-2-yl)-5-(hexyloxy)-phenol (Tinuvin® 1577, Ciba Spezialitätenchemie, Basel), and the benzophenones 2,4-dihydroxybenzophenone (Chimassorb® 22, Ciba Spezialitätenchemie, Basel) and 2-hydroxy-4-(octyloxy)-benzophenone (Chimassorb® 81, Ciba, Basel), 2-propenoic acid 2-cyano-3,3-diphenyl-2,2-bis[[(2-cyano-1-oxo-3,3-diphenyl-2-propenyl)oxy]-methyl]-1,3-propanediyl ester (9Cl) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, Ciba Spezialitätenchemie, Basel) or tetra-ethyl 2,2'-(1,4-phenylene-dimethylidene)-bismalonate (Hostavin® B-Cap, Clariant AG).

Mixtures of these ultraviolet absorbers can also be employed.

There are no particular limitations with respect to the amount of the ultraviolet absorber contained in the composition, as long as the desired absorption of UV radiation and an adequate transparency of the shaped article produced from the composition are ensured. According to a preferred embodiment of the invention, the composition contains ultraviolet absorbers in an amount of from 0.05 wt. % to 20.00 wt. %, in particular from 0.07 wt. % to 10.00 wt. % and very particularly preferably from 0.10 wt. % to 1.00 wt. %, based on the total composition.

Transparent thermoplastics in the context of the invention are e.g. polymers of ethylenically unsaturated monomers and/or polycondensates of bifunctional reactive compounds. Examples of transparent thermoplastic polymers are e.g. polycarbonates or copolycarbonates based on diphenols, poly- or copolyacrylates and poly- or copolymethacrylates, such as e.g. poly- or copolymethyl methacrylates (such as PMMA), and copolymers with styrene, such as e.g. transparent polystyrene/acrylonitrile (PSAN), or polymers based on ethylene and/or propylene and aromatic polyesters, such as polyethylene terephthalate (PET), polybutylene terephthalate (PBT), polyethylene naphthalate (PEN) or polyethylene terephthalate/cyclohexanedimethanol copolymer (PETG), transparent thermoplastic polyurethanes and polystyrenes. Polymers based on cyclic olefins (e.g. TOPAS®, a commercial product from Ticona) can furthermore also be mixed in.

Mixtures of several transparent thermoplastic polymers are also possible.

Particularly preferred polycarbonates are the homopolycarbonate based on bisphenol A, the homopolycarbonate based on 1,3-bis-(4-hydroxyphenyl)-3,3,5-trimethylcyclohexane and the copolycarbonates based on the two monomers bisphenol A and 1,1-bis-(4-hydroxyphenyl)-3,3,5-trimethylcyclohexane.

Polycarbonates in the context of the present invention are both homopolycarbonates and copolycarbonates; the polycarbonates can be linear or branched in a known manner.

The preparation of the polycarbonates is carried out in a known manner from diphenols, carbonic acid derivatives, optionally chain terminators and branching agents.

Details of the preparation of polycarbonates have been laid down in many patent specifications for about 40 years. Reference may be made here by way of example merely to Schnell, "Chemistry and Physics of Polycarbonates", Polymer Reviews, volume 9, Interscience Publishers, New York, London, Sydney 1964, to D. Freitag, U. Grigo, P. R. Müller, H. Nouvertne', BAYER AG, "Polycarbonates" in Encyclopedia of Polymer Science and Engineering, volume 11, second edition, 1988, pages 648-718 and finally to Dres. U. Grigo, K. Kirchner and P. R. Müller "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299.

Diphenols which are suitable for the preparation of the polycarbonates are, for example, hydroquinone, resorcinol, dihydroxydiphenyls, bis-(hydroxyphenyl)-alkanes, bis-(hydroxyphenyl)-cycloalkanes, bis-(hydroxyphenyl) sulfides, bis-(hydroxyphenyl)ethers, bis-(hydroxyphenyl) ketones, bis-(hydroxyphenyl) sulfones, bis-(hydroxyphenyl) sulfoxides, alpha-alpha'-bis-(hydroxyphenyl)-diisopropylbenzenes, phthalimidines derived from derivatives of isatin or of phenolphthalein, and nucleus-alkylated and nucleus-halogenated compounds thereof.

Preferred diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulfone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxy-phenyl)-propane, 2,2-bis-(3,5-dibromo-4-hydroxyphenyl)-propane and 1,1-bis-(4-hydroxyphenyl)-3,3,5-trimethylcyclohexane.

Particularly preferred diphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethylcyclohexane.

These and further suitable diphenols are described e.g. in U.S. Pat. No. 3,028,635, U.S. Pat. No. 2,999,825, U.S. Pat. No. 3,148,172, U.S. Pat. No. 2,991,273, U.S. Pat. No. 3,271,367, U.S. Pat. No. 4,982,014 and U.S. Pat. No. 2,999,846, in DE-A 1 570 703, DE-A 2 063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and in JP-A 62039/1986, JP-A 62040/1986 and JP-A 105550/1986.

In the case of homopolycarbonates, only one diphenol is employed, and in the case of copolycarbonates several diphenols are employed.

Suitable carbonic acid derivatives are, for example, phosgene or diphenyl carbonate.

Suitable chain terminators which can be employed in the preparation of the polycarbonates are both monophenols and monocarboxylic acids. Suitable monophenols are phenol itself, alkylphenols, such as cresols, p-tert-butylphenol, cumylphenol, p-n-octylphenol, p-iso-octylphenol, p-n-nonylphenol and p-iso-nonylphenol, halophenols, such as p-chlorophenol, 2,4-dichlorophenol, p-bromophenol and 2,4,6-tribromophenol, 2,4,6-triiodophenol, p-iodophenol and mixtures thereof.

Preferred chain terminators are phenol, cumylphenol and/or p-tert-butylphenol.

Suitable monocarboxylic acids are furthermore benzoic acid, alkylbenzoic acids and halobenzoic acids.

Preferred chain terminators are furthermore the phenols which are substituted once or several times by C1 to C30-alkyl radicals, linear or branched, preferably unsubstituted or substituted by tert-butyl.

The amount of chain terminator to be employed is preferably 0.1 to 5 mol %, based on the moles of particular diphenols employed. The chain terminators can be added before, during or after the phosgenation.

Suitable branching agents are the tri- or more than trifunctional compounds known in polycarbonate chemistry, in particular those with three or more than three phenolic OH groups.

Suitable branching agents are, for example, phloroglucinol, 4,6-dimethyl-2,4,6-tri-(4-hydroxyphenyl)-hept-2-ene, 4,6-dimethyl-2,4,6-tri(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenyl-isopropyl)-phenoxy)-methane and 1,4-bis-((4',4"-dihydroxytriphenyl)-methyl)-benzene as well as 2,4-dihydroxybenzoic acid, trimesic acid, cyanuric chloride and 3,3-bis-(3-methyl-4-hydroxyphenyl)-2-oxo-2,3-dihydroindole.

The amount of branching agents optionally to be employed is preferably 0.05 mol % to 2.00 mol %, based in turn on the moles of particular diphenols employed.

The branching agents either can be initially introduced with the diphenols and the chain terminators in the aqueous alkaline phase, or can be added as a solution in an organic solvent before the phosgenation. In the case of the transesterification process, the branching agents are employed together with the diphenols.

The aromatic polycarbonates of the present invention have weight-average molecular weights Mw (determined by gel permeation chromatography and calibration with polycarbonate calibration) of between 5,000 and 200,000, preferably between 10,000 and 80,000 and particularly preferably between 15,000 and 40,000 (this approximately corresponds to between 12,000 and 330,000, preferably between 20,000 and 135,000 and particularly preferably between 28,000 and 69,000, determined by calibration by means of a polystyrene standard).

The polycarbonates according to the invention can be prepared by any known process, e.g. by the interfacial process or by the melt transesterification process, but polycarbonates from the interfacial process are preferred.

In addition to the stabilizers according to the invention, the polymer compositions according to the invention can optionally also contain further conventional polymer additives, such as e.g. the mould release agents, flameproofing agents, colouring agents or optical brighteners described in EP-A 0 839 623, WO-A 96/15102, EP-A 0 500 496 or "Plastics Additives Handbook", Hans Zweifel, 5th edition 2000, Hansen Verlag, Munich), in the conventional amounts for the particular thermoplastics, and of the further conventional polymer additives mentioned which the compositions optionally contain, colouring agents being particularly preferred in a specific embodiment of the invention.

Preferably, the further polymer additives are employed in amounts of from 0 wt. % up to 5 wt. %, further preferably 0.1 wt. % to 1.0 wt. %, in each case based on the amount of the particular total polymer compositions. Mixtures of several additives are also suitable.

In a particular embodiment of the present invention, the polymer composition is free from phosphates, phosphoric acid, phosphoric acid derivatives or corresponding stabilizers which contain or can form these compounds.

Colouring agents or pigments in the context of the present invention are sulfur-containing pigments, such as cadmium red and cadmium yellow, pigments based on iron cyanide, such as Berlin blue, oxide pigments, such as titanium dioxide, zinc oxide, red iron oxide, black iron oxide, chromium oxide, titanium yellow, zinc-iron based brown, titanium-cobalt based green, cobalt blue, copper-chromium based black and copper-iron based black or chromium-based pigments, such as chromium yellow, phthalocyanine-derived dyestuffs, such as copper phthalocyanine blue and copper phthalocyanine green, condensed polycyclic dyestuffs and pigments, such as azo-based (e.g. nickel azo yellow), sulfur-indigo dyestuffs, perynone-based, perylene-based, quinacridone-derived, dioxazine-based, isoindolinone-based and quinophthalone-derived derivatives, anthraquinone-based, heterocyclic systems.

Concrete examples of commercial products are e.g. MACROLEX® Blau RR, MACROLEX® Violett 3R, MACROLEX® Violett B (Lanxess AG, Germany), Sumiplast® Violett RR, Sumiplast® Violett B, Sumiplast® Blau OR, (Sumitomo Chemical Co., Ltd.), Diaresin® Violett D, Diaresin® Blau G, Diaresin® Blau N (Mitsubishi Chemical Corporation), Heliogen® Blau or Heliogen® Gran (BASF AG, Germany).

Of these, cyanine derivatives, quinoline derivatives, anthraquinone derivatives and phthalocyanine derivatives are preferred.

Particularly suitable mould release agents for the composition according to the invention are e.g. pentaerythritol tetrastearate (PETS) or glycerol monostearate (GMS) and carbonates thereof and mixtures of these mould release agents.

Methods for the preparation of the polymer compositions according to the invention are known to the person skilled in the art.

The preparation of the polymer compositions according to the invention containing a thermoplastic and an IR absorber, preferably an inorganic IR absorber from the group of tungstates, zinc-doped tungsten compounds or borides, and the stabilizer combination according to the invention and optionally further conventional Polymer additives is carried out with the usual incorporation processes by bringing together, mixing and homogenizing the individual constituents, the homogenization in particular preferably taking place in the melt under the action of shearing forces. The bringing together and mixing are optionally carried out before the melt homogenization, using powder premixes.

Premixes which have been prepared from solutions of the mixing components in suitable solvents, homogenization optionally being carried out in solution and the solvent then being removed, can also be used.

In particular, the IR absorbers, heat stabilizers, ultraviolet absorbers and other additives of the composition according to the invention can be introduced here by known processes or as a masterbatch.

The use of masterbatches is preferred in particular for introduction of the IR absorber in combination with the stabilizer combination, masterbatches based on polycarbonate into which the IR absorbers have been introduced in the form of a ready-to-use IR absorber formulation containing dispersing agents, preferably dispersing agents based on polyacrylate, polyether or polyester, of these preferably dispersing agents which have a high heat stability, such as a polyacrylate (homo- or copolymer), such as e.g. polymethyl methacrylate, and/or polyesters or mixtures thereof, and furthermore containing auxiliary substances, such as, for example, zirconium dioxide, and optionally residual solvents, such as, for example, toluene, benzene or similar aromatic hydrocarbons, being used in particular. By using these masterbatches in combination with the corresponding IR absorber formulations, an agglomeration of the IR absorber in the polymer composition is effectively prevented.

In this connection, the composition can be brought together, mixed, homogenized and then extruded in conventional devices, such as screw extruders (for example twin-screw extruders, TSE), kneaders or Brabender or Banbury mills. After the extrusion, the extrudate can be cooled and comminuted. Individual components can also be premixed and the remaining starting substances can then be added individually and/or likewise as a mixture.

In a particular embodiment, the IR absorber according to the invention is optionally mixed with the phosphine stabilizer according to the invention or a mixture containing a phosphine compound according to the invention together with a phosphite or a phenolic antioxidant or a mixture of the two latter compounds to form a masterbatch before incorporation into the thermoplastic polymer matrix, the mixing preferably taking place in the melt under the action of shearing forces (for example in a kneader or twin-screw extruder). This process offers the advantage that the IR absorber is also already protected during the compounding and damage to it is avoided. For preparation of the masterbatch, the thermoplastic which is also the main component of the final total polymer composition is preferably chosen as the polymer matrix.

The masterbatch prepared in this way contains
C.1: 85.000 wt. %-98.895 wt. %, preferably 93.00 wt. %-98.895 wt. % of a transparent thermoplastic;
C.2: 0.100 wt. %-2.000 wt. % of IR absorber, preferably as an inorganic IR absorber, and
C.3: 1.000 wt. %-4.800 wt. % of dispersing agent
C.4: 0.005 wt. %-1.000 wt. %, further preferably 0.010 wt. %-0.500 wt. %, particularly preferably 0.050 wt. % of the stabilizer combination according to the invention
C.5: optionally 0.000-8.000 wt. % of at least one further auxiliary substance and/or additive, such as e.g. zirconium dioxide,
the sum of components C.1-C.5 adding up to 100 wt. %.

In a preferred embodiment, the inorganic IR absorber is present in combination with the stabilizer combination according to the invention in an acrylate matrix. In a further preferred embodiment, the transparent thermoplastic is a polycarbonate.

The polymer compositions according to the invention can be processed to products or shaped articles for example by first extruding the polymer compositions to granules, as described, and processing these granules to various products or shaped articles by suitable processes in a known manner.

In this connection, the compositions according to the invention can be converted, for example, by hot pressing, spinning, blow moulding, thermoforming, extrusion or injection moulding into products or shaped articles, shaped objects, such as toy parts, fibres, films, tapes, sheets, such as solid sheets, multi-wall sheets, twin-wall sheets or corrugated sheets, vessels, tubes or other profiles. The use of multi-layer systems is also of interest. The application can be effected at the same time as or immediately after the shaping of the base body, e.g. by coextrusion or multi-component injection moulding. However, the application can also be effected on the ready-formed base body, e.g. by lamination with a film or by coating with a solution.

However, sheets of a base and optional top layer/optional top layers are preferably produced by (co)extrusion.

For the extrusion, the polymer composition which has optionally been pretreated, e.g. by means of drying, is fed to the extruder and melted in the plasticating system of the extruder. The plastics melt is then forced through a sheet die or a multi-wall sheet die and thereby formed, brought into the desired final shape in the nip of a polishing calender and fixed in shape by alternate cooling on polishing rolls and in the ambient air. The temperatures necessary for extrusion of the polymer composition are set, it usually being possible to follow the manufacturer's instructions. If the polymer compositions contain, for example, polycarbonates of high melt viscosity, these are usually processed at melt temperatures of from 260° C. to 350° C., and the barrel temperatures of the plasticating barrel and the die temperatures are set accordingly.

By using one or more side extruders and a multichannel die or optionally suitable melt adapters before a sheet die, thermoplastic melts of different composition can be laid on top of one another and multi-layered sheets or films can be produced in this way (for the coextrusion see, for example, EP-A 0 110 221, EP-A 0 110 238 and EP-A 0 716 919, for details of the adapter and die process see Johannaber/Ast: "Kunststoff-Maschinenführer", Hanser Verlag, 2000 and in Gesellschaft Kunststofftechnik: "Coextrudierte Folien und Platten: Zukunftsperspektiven, Anforderungen, Anlagen und Herstellung, Qualitätssicherung", VDI-Verlag, 1990).

Products or shaped articles which are preferred according to the invention are sheets, films, glazing, for example automobile windows, windows of track vehicles and aircraft, automobile sunroofs, panorama roofs, roofing or building glazing, which contain the compositions according to the invention. In this context, in addition to solid sheets, twin-wall sheets or multi-wall sheets can also be used. As further components of the products according to the invention, in addition to the compositions according to the invention, the products according to the invention can contain, for example, further material parts. For example, glazing can have sealing materials at the edge of the glazing. Roofing can contain, for example, metal components, such as screws, metal pins or the like, which can serve for fixing or guiding (in the case of folding or sliding roofs) the roofing elements. Further materials can furthermore be combined with the compositions according to the invention, e.g. in 2-component injection moulding. Thus, the corresponding component with IR-absorbing properties can be provided with an edge which serves e.g. for gluing.

The articles containing the polymer composition of the present invention have cloud values (non-weathered) of less than 4%, preferably less than 3%, further preferably less than 2.5% and particularly preferably 2%, a value of less than 4% already corresponding to no significant clouding. Cloud values are based here on an initial clouding of non-aged products.

The articles moreover have a $T_{DS}$ value of preferably <80% ($T_{DS}$: direct solar transmittance; values are measured on optical colour sample sheets with a thickness of 4 mm. The total transmission $T_{DS}$ is calculated in accordance with ISO 13837, computational convention "A").

In a particular embodiment, the articles produced from the composition of the present invention are coated. This coating serves to protect the thermoplastic material from general weathering influences (e.g. damage by sunlight) and from mechanical impairment of the surface (e.g. scratching) and thus increases the resistance of the correspondingly treated articles.

It is known that polycarbonate can be protected from UV radiation by means of various coatings. These coatings conventionally contain UV absorbers. These layers likewise increase the scratch resistance of the corresponding article. The articles from the present invention can carry one layer or multi-layer systems. They can be coated on one or both sides. In a preferred embodiment, the article contains a scratch-resistant lacquer containing UV absorbers. In a particular embodiment, the multi-layer product comprises at least one layer comprising the composition according to the invention, at least one UV protective layer and optionally a scratch-resistant coating.

In the case of glazing materials, the article carries at least one scratch-resistant or antireflex coating on at least one side.

The coating, e.g. an antireflex coating, can be produced via various methods. For example, coating can be carried out via various methods of vapour deposition, e.g. via electron beam processes, resistance heating and via plasma deposition or various sputtering methods, such as high frequency sputtering, magnetron sputtering, ion beam sputtering or ion plating by means of DC, RF, HCD methods, reactive ion plating etc., or chemical gas phase deposition. An antireflex coating can furthermore also be applied from solution. Thus, via a dispersion of a metal oxide of high refractive index, such as $ZrO_2$, $TiO_2$, $Sb_2O_5$ or $WO_3$, in a silicon-based lacquer, a corresponding coating solution can be prepared which is suitable for coating plastics articles and can undergo thermal or UV-assisted curing.

Various methods for producing a scratch-resistant coating on articles of plastic are known. For example, epoxy-, acrylic-, polysiloxane-, colloidal silica gel- or inorganic/organic-(hybrid systems)-based lacquers can be used. These systems can be applied, for example, via dipping processes, spincoating, spray processes or flow coating. Curing can be carried out by means of heat or by means of UV irradiation. Single- or multi-layer systems can be used. The scratch-resistant coating can be applied e.g. directly or after preparation of the substrate surface with a primer. Furthermore, a scratch-resistant coating can be applied via plasma-assisted polymerization processes, e.g. via an $SiO_2$ plasma. Antifogging or antireflex coatings can likewise be produced via plasma processes. It is furthermore possible to apply a scratch-resistant coating to the resulting shaped article via certain injection moulding processes, such as e.g. back injection moulding of surface-treated films. Various additives, such as e.g. UV absorbers derived e.g. from triazoles or triazines, can be present in the scratch-resistant layer. This can furthermore contain IR absorbers of an organic or inorganic nature. These additives can be contained in the scratch-resistant lacquer itself or in the primer layer. The thickness of the scratch-resistant layer is 1 μm-20 μm, preferably 2 μm-15 μm. Below 1 μm the resistance of the scratch-resistant layer is inadequate. Above 20 μm cracks often occur in the lacquer. The base material according to the invention which is described in the present invention is preferably provided with a scratch-resistant and/or antireflex layer described above after production of the injection moulded article, since the preferred field of use lies in the window or automobile glazing sector.

For polycarbonates, a primer containing a UV absorber is preferably employed in order to improve the adhesion of the scratch-resistant lacquer. The primer can contain further stabilizers, such as e.g. HALS systems (stabilizers based on sterically hindered amines), adhesion promoters and flow auxiliaries. The particular resin can be chosen from a large number of materials and is described e.g. in Ullmann's Encyclopedia of Industrial Chemistry, 5th edition, vol. A18, pp.

368-426, VCH, Weinheim 1991. Polyacrylates, polyurethanes, phenol-based, melamine-based, epoxy and alkyd systems or mixtures of these systems can be employed. The resin is usually dissolved in suitable solvents—often in alcohols. Depending on the resin chosen, curing can be carried out at room temperature or at elevated temperatures. Preferably, temperatures of between 50° C. and 130° C. are employed—often after a large proportion of the solvent has been briefly removed at room temperature. Commercially obtainable systems are e.g. SHP470, SHP470FT2050 and SHP401 from Momentive Performance Materials. Such coatings are described e.g. in U.S. Pat. No. 6,350,512 BI, U.S. Pat. No. 5,869,185, EP 1308084, WO 2006/108520.

Scratch-resistant lacquers (hard coat) are preferably built up from siloxanes and preferably contain UV absorbers. They are preferably applied via dipping or flow processes. Curing is carried out at temperatures of 50° C.-130° C. Commercially obtainable systems are e.g. AS4000, SHC5020 and AS4700 from Momentive Performance Materials. Such systems are described e.g. in U.S. Pat. No. 5,041,313, DE 3121385, U.S. Pat. No. 5,391,795, WO 2008/109072. The synthesis of these materials is usually carried out via condensation of alkoxy- and/or alkylalkoxysilanes under acid or base catalysis. Nanoparticles can optionally be incorporated. Preferred solvents are alcohols, such as butanol, isopropanol, methanol, ethanol and mixtures thereof.

Instead of primer/scratch resistant coating combinations, one-component hybrid systems can be employed. These are described e.g. in EP0570165 or WO 2008/071363 or DE 2804283. Commercially obtainable hybrid systems are obtainable e.g. under the names PHC587 or UVHC 3000 from Momentive Performance Materials.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

The invention is described in more detail with the aid of embodiment examples in the following, the determination methods described here being used for all the corresponding parameters in the present invention if nothing to the contrary had been described.

The melt volume rate (MVR) is determined in accordance with ISO 1133 (at 300° C.; 1.2 kg).

Determination of the $T_{DS}$ value (direct solar transmittance):

The transmission and reflection measurements were performed on a Perkin Elmer Lambda 900 spectrophotometer with a photometer sphere (i.e. determination of the total transmission by measurement both of the diffuse and direct transmission and of the diffuse and direct reflection). All the values were determined from 320 nm to 2,300 nm.

The total transmission $T_{DS}$ was calculated in accordance with ISO 13837, computational convention "A".

Storage of the samples in heat takes place in a circulating air oven. Storage in heat took place at 110° C. and 120° C. The change in the $T_{DS}$ values ($\Delta T_{DS} = T_{DS\ 528\ h/1,000\ h} - T_{DS\ 0\ h}$) is shown in Table 1. From the values measured, the percentage change in the corresponding values, based on $T_{DS\ 0\ h}$, was calculated. The results are shown in Table 2.

For production of the test specimens, the additive-free polycarbonate Makrolon® 2608 (linear bisphenol A polycarbonate) from Bayer MaterialScience with a melt volume index (MVR) of 12 cm³/10 min at 300° C. under a 1.2 kg load in accordance with ISO 1133 was used.

The compounding of the additives was carried out on a twin-screw extruder from KraussMaffei Berstorff type ZE25 at a housing temperature of 260° C. and a melt temperature of 270° C. at a speed of rotation of 100 rpm with the amounts of additives stated in the examples.

The granules are dried in vacuo at 120° C. for 3 hours and then processed on an injection moulding machine of the Arburg 370 type with a 25 injection unit at a melt temperature of 300° C. and a mould temperature of 90° C. to give colour sample sheets with the dimensions 60 mm×40 mm×4 mm.

A caesium tungstate ($Cs_{0.33}WO_3$) dispersion (YMDS 874 from Sumitomo Metal Mining, Japan, acrylate dispersion) is employed as the IR absorber, the solids content of caesium tungstate in the dispersion being 25 wt. %. The weight data in the examples relate to the caesium tungstate as the pure substance.

A zinc-doped caesium tungstate $Zn_w Cs_{0.33} WO_3$ (=0.001-015) is employed as a further IR absorber, the solids content of doped caesium tungstate in the dispersion being 25 wt. %. The weight data in the examples relate to the zinc-doped caesium tungstate as the pure substance.

Preferably, the weight ratio of $Cs_{0.33}WO_3$ to ZnO in the doped tungstate is 77.4:22.6.

The following compounds were employed as stabilizers for stabilizing the inorganic IR absorber:

T1: Triphenylphosphine (TPP, Sigma-Aldrich, 82018 Taufkirchen, Germany)

T2: Irgafos® 168 (CAS 31570-04-4) BASF AG; Ludwigshafen

T3: Irganox® 1076 (CAS 2082-79-3); BASF AG; Ludwigshafen

T4: Irgafos® PEP-Q (tetrakis(2,4-di-tert-butylphenyl)[1,1-biphenyl]-4,4'-diylbisphosphite; BASF AG; Ludwigshafen)

Example 1

Comparison Example

Makrolon® 2608 is compounded with 0.015 wt. % of caesium tungstate, $Cs_{0.33}WO_3$, (corresponds to 0.060 wt. % of YMDS 874 dispersion) as described above. The results of the storage in heat are shown in Table 1.

Example 2

Comparison Example

Makrolon® 2608 is compounded with 0.015 wt. % of zinc-doped caesium tungstate (corresponds to 0.060 wt. % of zinc-doped caesium tungstate dispersion) as described above. The results of the storage in heat are shown in Table 1.

Example 3

Comparison Example 0.015 wt. % of caesium tungstate, $Cs_{0.33}WO_3$, (corresponds to 0.060 wt. % of YMDS 874 dispersion) and 0.050 wt. % of triphenylphosphine (T1) are added to Makrolon® 2608 under the conditions described above.

Example 4

Comparison Example

Makrolon® 2608 is compounded with 0.015 wt. % of zinc-doped caesium tungstate (corresponds to 0.060 wt. % of zinc-doped caesium tungstate dispersion) and 0.050 wt. % of triphenylphosphine (T1) as described above. The results of the storage in heat are shown in Table 1.

Example 5

Comparison Example 0.015 wt. % of caesium tungstate, $Cs_{0.33}WO_3$, (corresponds to 0.060 wt. % of YMDS 874 dispersion) and 0.1 wt. % of Irgafos® PEP-Q (T4) are added to Makrolon® 2608 under the conditions described above.

Example 6

According to the Invention 0.015 wt. % of caesium tungstate, $Cs_{0.33}WO_3$, (corresponds to 0.060 wt. % of YMDS 874 dispersion) and 0.050 wt. % of triphenylphosphine (T1) and 0.040 wt. % of Irgafos® 168 (T2) and 0.010 wt. % of Irganox® 1076 (T3) are added to Makrolon® 2608 under the conditions described above.

Example 7

According to the Invention

Makrolon® 2608 is compounded with 0.015 wt. % of zinc-doped caesium tungstate (corresponds to 0.060 wt. % of zinc-doped caesium tungstate dispersion) and 0.050 wt. % of triphenylphosphine (T1) and 0.040 wt. % of Irgafos® 168 (T2) and 0.010 wt. % of Irganox® 1076 (T3) as described above.

TABLE 1

Change in the IR properties after storage in heat (storage in heat at 110° C., unless stated otherwise)

| Example no. | Stabilizer employed | $\Delta T_{DS}$ (528 h; unless stated otherwise) | $\Delta T_{DS}$ (1,000 h) |
|---|---|---|---|
| 1 (comparison) | — | 5.4 | 6.2 |
| 2 (comparison) | — | 4.9 | 5.6 |
| 3 (comparison) | T1 | 2.0<br>2.4 (120° C.) | 2.4<br>5.4 (120° C.) |
| 4 (comparison) | T1 | 0.8<br>1.1 (120° C.) | 0.9<br>4.8 (120° C.) |
| 5 (comparison) | T4 | 9.6<br>15 (120° C.) | 14.0<br>18.7 (120° C.) |
| 6 (according to the invention) | T1/T2/T3 | 1.0 (110° C.)<br>1.5 (120° C.) | 1.2 (110° C.)<br>2.8 (120° C.) |
| 7 (according to the invention) | T1/T2/T3 | 0.9 (110° C.)<br>1.3 (120° C.) | 1.1 (110° C.)<br>1.8 (120° C.) |

TABLE 2

Change in the IR properties after storage in heat in % (unless stated otherwise at 110° C.)

| Example no. | Stabilizer employed | $\Delta T_{DS}$ (528 h; unless stated otherwise) [%] | $\Delta T_{DS}$ (1,000 h) [%] |
|---|---|---|---|
| 1 (comparison) | — | 9.3 | 10.7 |
| 2 (comparison) | — | 8.3 | 9.7 |
| 3 (comparison) | T1 | 3.7<br>4.3 (120° C.) | 4.3<br>9.6 (120° C.) |
| 4 (comparison) | T1 | 1.2<br>1.9 (120° C.) | 1.6<br>8.4 (120° C.) |
| 5 (comparison) | T4 | 20.1<br>31.8 (120° C.) | 29.6<br>39.7 (120° C.) |
| 6 (according to the invention) | T1/T2/T3 | 1.9 (110° C.)<br>2.6 (120° C.) | 2.1 (110° C.)<br>4.9 (120° C.) |
| 7 (according to the invention) | T1/T2/T3 | 1.6 (110° C.)<br>2.3 (120° C.) | 1.9 (110° C.)<br>3.2 (120° C.) |

The addition of stabilizer T1 leads to more stable properties over time both with conventional caesium tungstate and with the zinc-doped caesium tungstate. Nevertheless, a significant loss in IR absorption performance is detectable under high exposure to heat and over long storage times. The addition of other conventional stabilizers employed for thermoplastics surprisingly leads to destabilizing properties (Example 5). This was surprising and was not to be expected.

The $T_{DS}$ value of the compositions according to the invention increases significantly less after storage in heat, compared with the starting value before storage in heat, than that of the comparison examples, which means a better IR absorption property after the storage in heat.

Examples 6 and 7 show that by the combinations of inorganic IR absorber with a stabilizer combination of phosphine according to the invention, phosphite and phenolic antioxidant, the stability of the IR absorber can also be improved significantly at elevated storage temperatures (120° C./1,000 h). The $T_{DS}$ value of the compositions according to the invention increases significantly less after storage in heat, compared with the starting value before storage in heat, than that of the comparison examples, which means a better IR absorption property after the storage in heat.

The invention claimed is:

1. A stabilizer combination for stabilizing IR absorbers, comprising
   a) 10 wt. %-89 wt. % of at least one phosphine stabilizer,
   b) 10 wt. %-89 wt. % of at least one phosphite stabilizer, and
   c) 1 wt. %-50 wt. % of at least one phenolic antioxidant
   wherein the IR absorbers comprise a tungstate inorganic IR absorber.

2. The stabilizer combination according to claim 1, wherein the ratio of phosphine (a) to the mixture of phosphite and phenolic antioxidant (b+c) is 8:1 to 1:9, and wherein the ratio of phosphite stabilizer (b) to phenolic antioxidant (c) is from 1:5 to 10:1.

3. The stabilizer combination according to claim 1, wherein the phosphine is selected from the group consisting of triphenylphosphine (TPP), trialkylphenylphosphine, bis-diphenylphosphino-ethane, and trinaphthylphosphine.

4. The stabilizer combination according to claim 1, wherein the phosphite is selected from the group consisting of tris(2,4-di-tert-butyl-phenyl) phosphite, triphenyl phosphite, and tri(nonylphenyl) phosphite.

5. The stabilizer combination according to claim 1, wherein the phenolic antioxidant is selected from the group consisting of 2,6-di-tert-butyl-4-(octadecanoxycarbonyl-ethyl)phenol and tetrakis-(methylene-(3,5-di-(tert)-butyl-4-hydroxycinnamic acid))methane.

6. A composition comprising
   a. at least one tungstate IR absorber;
   b. the stabilizer combination according to claim 1, and
   c. optionally at least one transparent thermoplastic.

7. The composition according to claim 6, wherein the stabilizer combination is present in an amount of from 0.001 wt. % to 0.5 wt. % based on the total composition which comprises the transparent thermoplastic.

8. The composition according to claim 7, wherein the at least one IR absorber is present in an amount of from 0.0001 wt. %-10 wt. %, based on the total composition.

9. The composition according to claim 6, wherein the at least one IR absorber comprises a zinc-doped tungstate.

10. The composition according to claim 6, wherein the transparent thermoplastic material comprises a polycarbonate.

11. The composition according to claim 6, wherein the composition further comprises at least one compound selected from the group consisting of ultraviolet absorbers, colouring agents, mould release agents, and flameproofing agents.

12. An automobile, railway vehicle, aircraft or architectural glazing comprising the composition according to claim 6.

13. A masterbatch comprising:
   C.1: 85 wt. %-98.895 wt. % of a transparent thermoplastic;
   C.2: 0.1 wt. %-2 wt. % of an IR absorber, wherein the IR absorber comprises a tungstate inorganic IR absorber;
   C.3: 1 wt %-4.8 wt. % of dispersing agent;
   C.4: 0.005 wt. %-1 wt. % of the stabilizer combination according to claim 1; and
   C.5: optionally 0-8 wt. % of at least one further auxiliary substance and/or additive.

14. A method for stabilizing IR absorbers comprising adding the stabilizer combination according to claim 1 to a composition which comprises at least one IR absorber and a thermoplastic material.

* * * * *